June 17, 1958     F. E. OBERMAIER     2,839,039
THERMOSTATICALLY CONTROLLED CARBURETOR AIR INTAKE
Filed Jan. 24, 1956     3 Sheets-Sheet 1
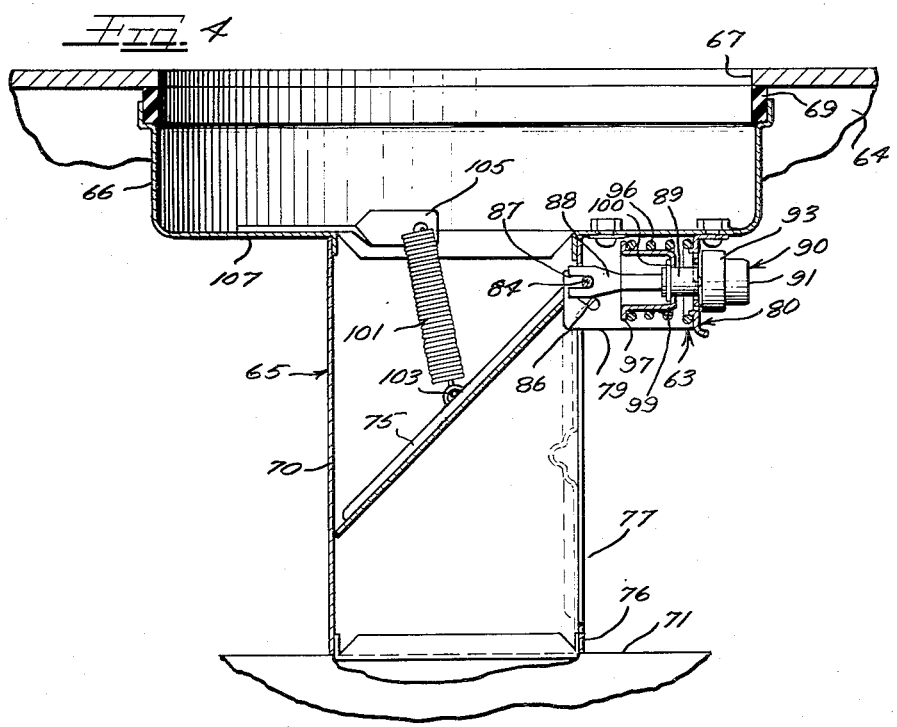
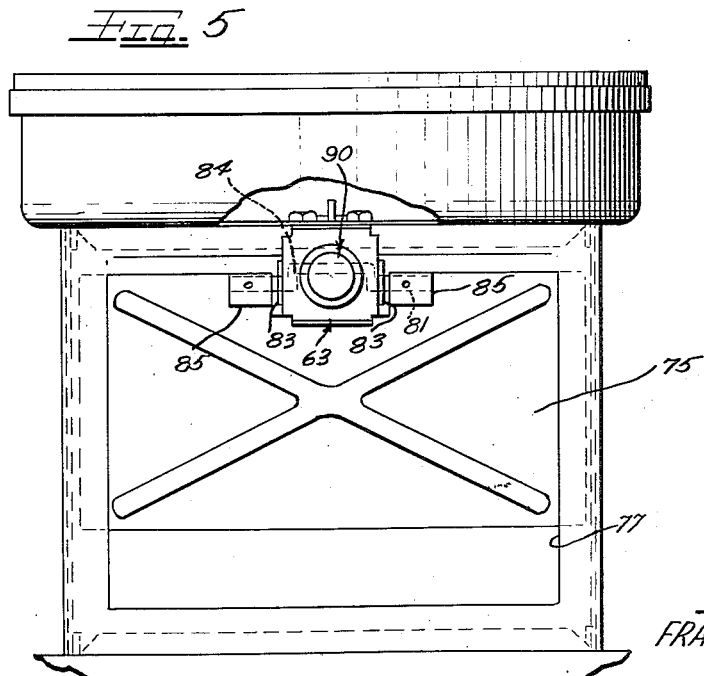
Inventor
FRANK E. OBERMAIER

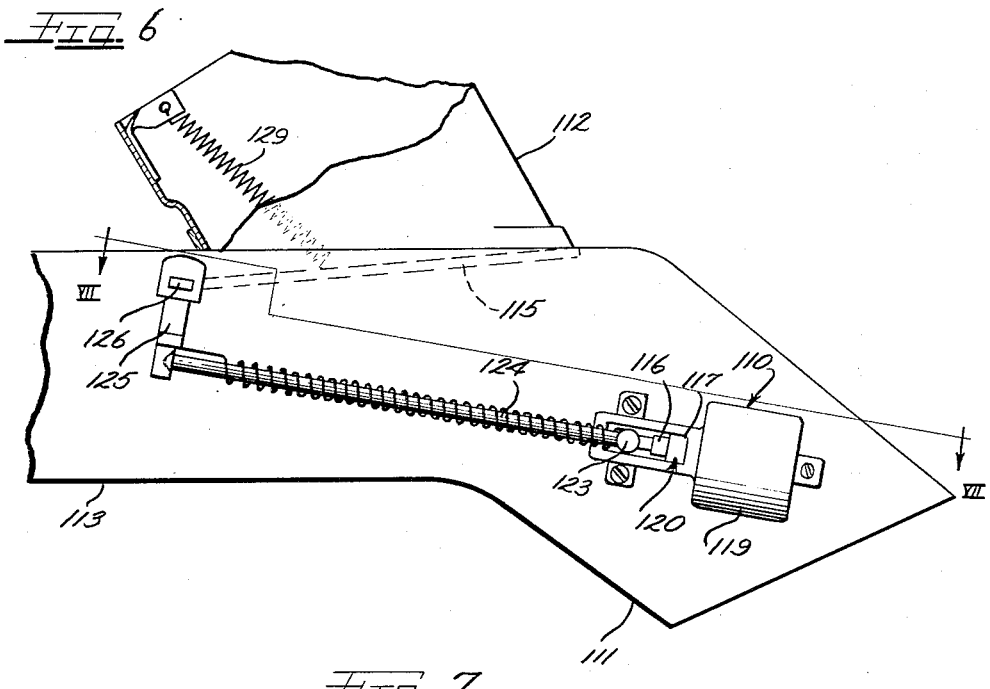

June 17, 1958  F. E. OBERMAIER  2,839,039
THERMOSTATICALLY CONTROLLED CARBURETOR AIR INTAKE
Filed Jan. 24, 1956  3 Sheets-Sheet 3
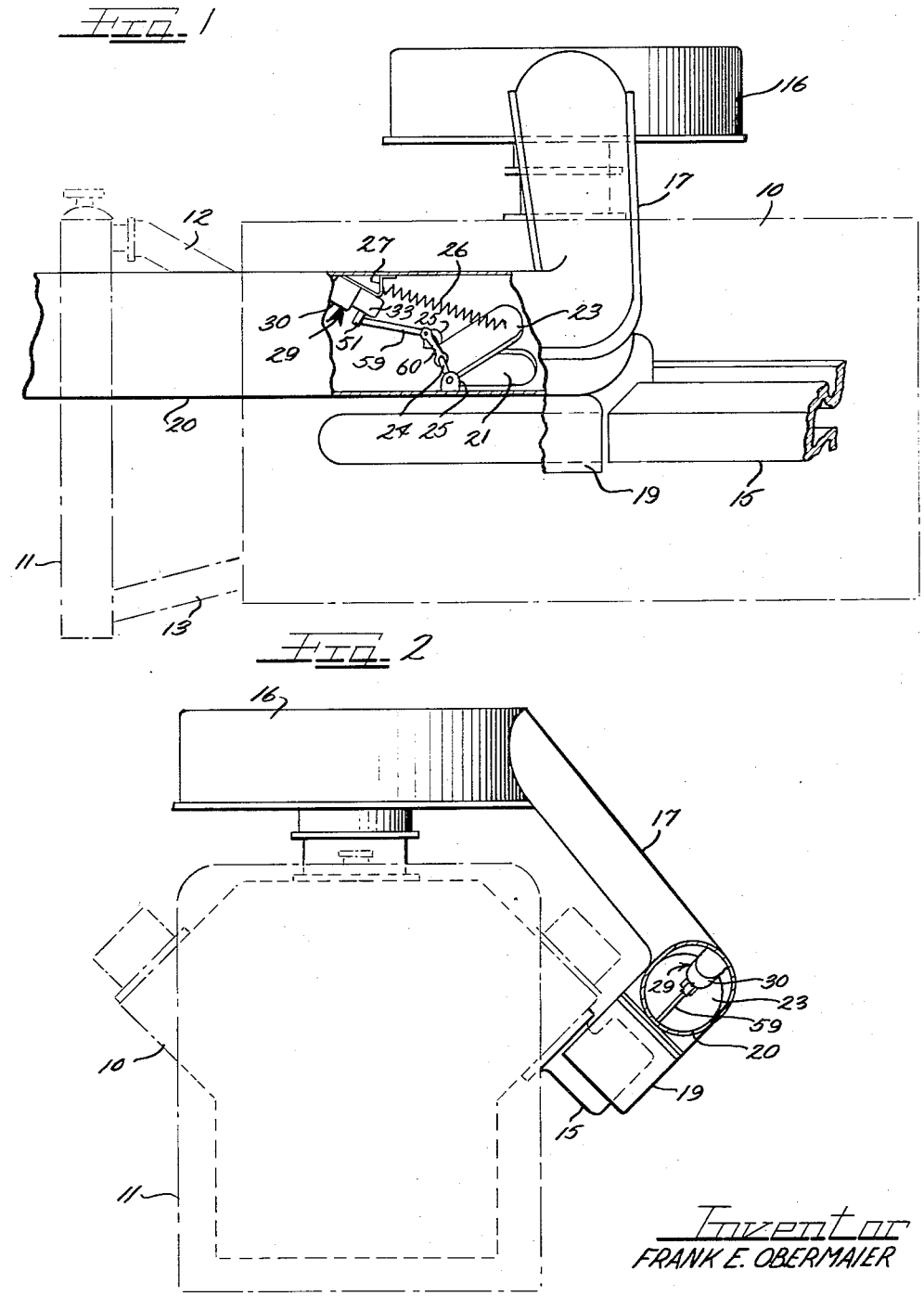
Inventor
FRANK E. OBERMAIER

United States Patent Office 2,839,039
Patented June 17, 1958

2,839,039

THERMOSTATICALLY CONTROLLED CARBURETOR AIR INTAKE

Frank E. Obermaier, Oak Park, Ill., assignor to The Dole Valve Company, Chicago, Ill., a corporation of Illinois Application January 24, 1956, Serial No. 561,035

3 Claims. (Cl. 123—122)

This invention relates to thermally operated devices particularly adapted to control the temperature of the air supplied to the carburetors of internal combustion engines.

A principal object of the invention is to provide a simple and improved form of thermally operated device sensing a selected air temperature and providing a controlled temperature of air to the carburetor of an internal combustion engine.

A further object of the invention is to provide a novel form of thermally operated device supplying a controlled temperature of air to the carburetor of an internal combustion engine arranged with a view toward increasing the speed of engine warm up, preventing carburetor icing and vapor lock and increasing the horsepower output of the engine during hot weather conditions.

Still another object of the invention is to provide a thermally operated device in the form of a precalibrated unit particularly adapted to sense a selected air temperature and to supply a controlled temperature of air to the carburetor of an internal combustion engine.

Still another object of the invention is to provide an air sensing and control device in association with the intake duct for the carburetor of an internal combustion engine, for supplying outside air, heated air, or mixed outside and heated air to the carburetor in accordance with a selected temperature setting of the sensing and control device.

A still further object of the invention is to provide a sensing and control device for the supply of air to the carburetor of an internal combustion engine in association with the intake air duct for the carburetor, and operating a damper to effect the supply of air to the carburetor from different temperature sources, to maintain the air temperature entering the carburetor high enough during cold weather conditions to prevent icing and low enough during hot weather conditions to prevent boiling of the gas with the resultant vapor lock.

A still further object of the invention is to provide a sensing and control device for the supply of air to the carburetor of an internal combustion engine, operating to supply air to the carburetor at different temperature ranges in accordance with the temperature range of one source of supply of air, so as to provide more oxygen by weight to the cylinders of the engine for each piston charge and to maintain the fuel oxygen ratio to such a ratio as to increase the horsepower of the engine and lengthen the life of the engine valves.

These and other objects of the invention will appear from time to time as the following specification proceeds and with reference to the accompanying drawings wherein:

Figure 1 is a diagrammatic view in side elevation of an internal combustion engine and intake air supply means therefor, illustrating one form in which the invention may be embodied.

Figure 2 is a front end view of the internal combustion engine and air supply means shown in Figure 1;

Figure 3 is an enlarged detail sectional view showing certain details of the thermostatic means for controlling the temperature of the air supplied to the carburetor of the internal combustion engine;

Figure 4 is a vertical sectional view taken through an intake duct for the supply of air to the carburetor of an internal combustion engine, and illustrating another form in which the invention may be embodied;

Figure 5 is an end view of the device shown in Figure 4, looking at the end of the thermal element for operating the device;

Figure 6 is a fragmentary diagrammatic view illustrating another form in which the invention may be embodied, in which the thermostatic device is located to sense the temperature of mixed and heated air; and Figure 7 is a fragmentary sectional view taken substantially along line VII—VII of Figure 6.

In the embodiment of the invention illustrated in Figures 1 and 2 of the drawings, I have diagrammatically shown by broken lines an internal combustion engine 10 of the water cooled type, cooled by a radiator 11 and having hose connections 12 and 13 for supplying water to be cooled from the engine to the upper end of the radiator, and for supplying cooled water from the lower end of the radiator to the water jacket of the engine (not shown) by operation of the usual pump (not shown).

I have also diagrammatically shown by solid lines an exhaust manifold 15, an air cleaner 16 spaced above the cylinder head, an intake duct 17 for air to the air cleaner and a stove 19 in the form of a metal duct extending around a portion of the exhaust manifold for supplying heated air to the intake duct 17. Air is supplied to the intake duct 17 through a duct 20 for outside air, having communication with the duct 17 and having a port 21 therein for supplying heated air from the stove 19 to the intake duct 17 under the control of a thermostatically operated damper 23.

The damper 23 is shown as being pivotally carried within the duct 20 to control the supply of heated air through the port 21 on a transverse shaft 24 secured to said damper and pivoted at its end on bearing supports 25 extending upwardly from the inside wall of the intake duct 20.

A tension spring 26 is shown as being provided to bias the damper 23 in a position to maintain the port 21 open. The tension spring 26 is connected at one end to the damper 23 adjacent the outer end of said damper and at its opposite end to a bracket 27 extending inwardly from the inside of the air duct 20, and suitably secured thereto. The bracket 27 also forms a mounting for a temperature sensing unit 29, for operating the damper against the bias of the spring 26, in accordance with the temperature of the outside air passing through the duct 20.

The thermal sensing unit 29 is shown in Figure 3 as comprising a housing 30 which may be stamped from sheet metal and having attachment lugs 31 extending therefrom for attachment to the bracket 27. One lug 31 is shown in Figure 4. It should, however, be understood that similar lugs may extend laterally from the housing, as shown in Figure 6, showing a sensing element similar to that shown in Figure 3. The housing 30 has a rear inner wall 36 against which is seated an overtravel and retaining spring 37 for a thermal element 39. The housing 30 also has a shoulder 40 spaced inwardly from the wall 36 and abutted by a flange 41 of a retainer 43 for the thermal element 39, and biased into engagement with a shoulder 40 by the spring 37 seated on the flange 41. The retainer 43 is shown as encircling a heat conductor ring 44 of the thermal element 39, and as having an inwardly extending annular portion 45 engaging said heat conductor ring and maintaining the thermal element 39 in position within the housing 30.

The thermal element 39 may be a well known form of power type of thermal element constructed along principles similar to those shown and described in the Vernet Patent No. 2,368,161 and includes generally a casing 46 containing a fusible thermally expansible material and reacting against a diaphragm (not shown) contained within the casing 46 for extending a power member or piston 47 from a cylinder 49 upon predetermined changes in temperature to which the thermal element is subjected, in accordance with the fusion range of the thermally expansible material.

The fusible thermally expansible material may be a wax alone, or a wax and a powdered metal heat conductor and a binder, the type of thermally expansible material used being selected for its fusion point or operating range in accordance with the desired temperature of operation of the thermal element.

The power member or piston 47 is shown as having a flattened outer end portion 50 extending through a lever 51 and loosely pivotally connected thereto as by a pivot pin 53. The lever 51 is pivotally mounted on a pivot pin 54 carried at its ends in a reduced cross-sectional area portion 33 of the casing 30 and suitably secured thereto.

The lever 50 is shown as extending through a slotted portion 55 of the reduced cross-sectional area portion 33 of the casing 30 and as having a socket 56 therein facing the damper 23 and engaged by a link 59. The link 59 is pivotally connected at its end opposite the lever 51 to a crank 60 secured to and extending upwardly from the damper shaft 25, to effect pivotal movement of the damper in a direction to close the port 21 upon extensible movement of the power member 47 from the cylinder 49.

It may be seen from Figures 1 and 2 that during normal operation of the engine 10, that a mixture of heated and outside air is supplied to the engine. As, however, the temperature of the outside air approaches a temperature value which may cause the mixture of the outside and heated air to cause boiling of the gasoline in the carburetor with a resultant vapor lock, the thermal element 39 sensing the outside air will come into operation to effect extension of the power member 47 to move the damper toward a closed position, and thus decrease the supply of heated air to the carburetor with a resultant total reduction in temperature of the air supplied thereto. In a contrary manner as the temperature of the air decreases to a temperature which may cause icing, the spring 26 will open the port 21 wide to raise the temperature of the air supplied to the carburetor. In addition to preventing vapor lock and icing, the temperature of the air is maintained at a temperature which will maintain a proper mixture of air and supply of oxygen to the pistons, to maintain the efficiency in operation of the engine for varying temperature conditions, and thus to increase the efficiency thereof and lengthen the life of the engine valves.

In the form of the invention illustrated in Figures 4 and 5, I have shown a temperature sensing element 63 controlling the supply of air to the carburetor (not shown) of an internal combustion engine by the temperature under a hood 64 for the engine. In this form of the invention, an intake duct 65 has a large diameter inlet end portion 66 in communication with an air inlet port 67 in the hood 64 and sealed to the hood as by a resilient seal 69.

The enlarged diameter inlet end portion 66 of the duct 65 is carried on the top of a reduced diameter mixing duct 70 having direct communication with the top of an air cleaner fragmentarily illustrated and designated generally by reference character 71. The duct 70 is arranged to supply air to the air cleaner 71 at outside temperatures, mixed temperatures between the temperature of outside air and under hood air, and at under hood temperatures under the control of a damper 75 operated by the air temperature sensing unit 63.

The mixing duct 70 may be generally rectangular in form and has a wall 76 having a port 77 leading therethrough and opening to air at under hood temperature to supply air to the air cleaner and carburetor (not shown) when the damper 75 is in the solid line position shown in Figure 4.

The damper 75 is pivotally mounted adjacent its upper end on opposite side walls 79 of a housing 80 for the sensing unit 63 on the coaxial ends of a crankshaft 81. The crankshaft 81 is journaled in the side walls 79 of the housing 80 at the upper ends of aligned slots 86 in bosses 83 extending laterally from the side walls 79. As herein shown, the crankshaft 81 has a crank 84 intermediate the ends thereof and extending between the side walls 79 of the housing 80. The coaxial ends of the crankshaft 81 are pinned or otherwise secured to bosses 85 extending outwardly from the damper 75 to effect pivotal movement of said damper upon pivotal movement of the crankshaft 81 effected by operation of the sensing unit 63 upon predetermined rises in temperature under the hood 64. The slots 86 accommodate the insertion of the crank 84 between the side walls 79 upon initially assembling the unit. The crank 84 is shown as being engaged within a slot 87 of an extensible power member 88 of the sensing unit 63. The power member 88 is slidably guided in a cylinder 89 of a thermostatic element 90 for extensible and retractable movement with respect thereto.

The thermostatic element 90 may be like the thermostatic element 39 shown in Figures 3 and 4 and includes a casing 91 containing a thermally expansible material and a heat conducting ring 93 having rocking engagement with the rear wall of the housing 80. The thermostatic element 90 is retained to the housing by means of a compression spring 96 seated on the inside of the rear wall of said housing at one end and seated on a flange 97 of a retainer 99 at its opposite end. The spring 96 besides serving to rockably retain the thermal element to the housing 80 also serves as an overtravel spring for the thermal element. The retainer 99 is shown as abutting and reacting against a snap ring 100 on the cylinder 89 for the thermal element.

The damper 75 is biased in the position shown in Figure 5 to open the port 77 to supply air to the air cleaner 71 at underhood temperatures by means of a tension spring 101 secured at one end to an eye 103 formed integrally with the damper 75, intermediate its ends, and secured at its opposite end to a bracket 105 extending inwardly of the duct 70 and suitably secured to a horizontal wall 107 of the intake duct 66. The tension spring 101 not only serves to bias the damper 75 in position to supply air to the air cleaner 71 at underhood temperature, but also serves as a return spring for the power member 88 of the thermal element 90 and to maintain the crankshaft 81 in bearing engagement with the upper ends of the slots 87.

The sensing unit 63 like the sensing unit 30 is a compact and unitary unit, which may readily be connected with the damper and attached to the wall 107 of the intake duct 66, and may readily be interchanged with units calibrated to operate at different temperatures in accordance with the operating condition of the engine, to maintain the temperature of the intake air at temperatures which will prevent icing in winter, vapor lock in summer and will increase the efficiency of operation of the engine for all temperature conditions to which the engine is subjected.

In the form of the invention illustrated in Figures 6 and 7, I have shown a sensing unit 110 located in a duct 111 which may be connected with an air cleaner (not shown) for supplying air thereto at the temperature of outside air through a duct 112 or at the temperature of heated air through a duct 113, or at various intermediate temperatures of the mixed heated and outside air under the control of a damper 115 operated by the sensing unit 110, which is shown as being located to sense mixed air under normal operating conditions.

The sensing unit 110 is like the sensing unit 29 shown in Figure 3, so need not herein be shown or described in detail, and includes a power member 116 extensible from a cylinder 117 of a thermal element 120 carried within a housing 119, and like the housing 30 for the thermal element 39.

As shown in Figure 7, the sensing unit 110 is recessed within a wall 121 of the mixed air duct 111 to position the thermal element 120 in the path of the mixed outside and heated air flowing through the mixed air duct 111. A lever arm 123, operated by the extensible power member 116 upon predetermined increases in temperature of the mixed air, extends outwardly of the casing 119 and wall 121. A link 124 has pivotal bearing engagement at one end with the arm 123 and has pivotal bearing engagement at its opposite end with a lever arm 125 secured to and extending downwardly from a damper shaft 126 for the damper 115, for pivoting said damper shaft and damper in a direction, which in Figure 7 is shown as being a clockwise direction as the power member 116 is extended from the cylinder 117, upon certain increases in temperature of the mixed air. The link 124 is retained in bearing engagement with the lever arms 123 and 125 by means of a tension spring 127 connected at its ends to said lever arms. A return spring 129 is provided to bias the damper 115 in the dashed line position shown in Figure 7 and to retractibly move the power member 116 with respect to the cylinder 117.

Such a damper arrangement, with the thermal element located in the stream of the mixed air, is particularly advantageous in maintaining the air supplied to the carburetor at a high enough temperature in winter time to prevent condensation of the air and resultant icing of the carburetor and to maintain the temperature of the air in summer time at a low enough temperature to maintain the efficiency of operation of the engine and to prevent boiling of the gas with the resultant vapor lock.

It is, of course, understood that the sensing unit 110 may be calibrated to operate at certain selected temperature ranges and that the sensing unit may readily be interchanged with other sensing units, where it is desired that the temperature at which the sensing unit operates be varied, either for seasonal conditions or to increase the efficiency of operation of the engine by providing a selected air temperature at which the engine will operate at its utmost efficiency.

It will be understood that modifications and variations in the present invention may be effected without departing from the spirit and scope of the novel concepts thereof.

I claim as my invention:

1. In a sensing and control device controlling the temperature of the air supplied to the carburetor of an internal combustion engine, an air intake duct having a damper therein pivotally mounted to control the supply of air to the carburetor from an outside source and from a second source heated by the temperature under the hood for the engine, a spring biasing said damper to supply air to said intake duct at the temperature under the hood for the engine, and theremostatic means located outside of said duct to sense the temperature of the air under the hood for the engine and having a power member extensible upon predetermined increases in temperature, a crank coaxial with the axis of said damper for pivoting said damper against the bias of said spring, and an operative connection from said power member to said crank to operate said damper to vary the temperature of the air supplied to the carburetor in accordance with the temperature of the air under the hood for the engine.

2. In a sensing and control device for the supply of air to the carburetor of an internal combustion engine, an air intake duct having communication with the carburetor of an internal combustion engine for supplying air thereto and having an end open to air at outside temperatures and also having a port in the wall thereof open to air at under hood temperatures, a damper pivotally carried within said intake duct, and a spring biasing said damper into position to block the passage of outside air to said duct and accommodate the passage of heated air to said duct at under hood temperatures, a thermal element on the outside of said intake duct and having an extensible power member extending within said duct and having operative connection with said damper to move said damper into position to block the passage of heated air to said duct upon predetermined increases in temperature, and means for mounting said thermal element on said air intake duct for ready removal therefrom to accommodate the substitution of thermal elements calibrated for different temperature ranges of operation to change the operating temperature range of said damper including a bracket mounted on the outside of said duct and having said thermal element rockingly mounted thereon and an overtravel spring retaining said thermal element to said bracket and accommodating movement of said thermal element with respect to said bracket upon overtravel of said power member.

3. In an air supply system having a thermostatically operated damper for controlling the proportions of air at different temperatures supplied to a mixing duct, a duct having a first inlet through an end thereof and a second inlet through a side wall thereof, a bracket mounted adjacent said second inlet outside of said duct, a shaft supported by said bracket, a damper mounted on said shaft for pivotal movement inside said duct, a spring biasing said damper in a direction to block flow through said first inlet, and a thermally responsive element mounted in said bracket outside said duct and operative upon increases in temperature of air entering said second inlet to pivot said damper in a direction to block flow through said second inlet.

References Cited in the file of this patent

UNITED STATES PATENTS

| | | |
|---|---|---|
| 1,876,679 | Holmes | Sept. 13, 1932 |
| 1,933,365 | Chandler et al. | Oct. 31, 1933 |
| 2,058,204 | Ball et al. | Oct. 20, 1936 |
| 2,084,991 | Callahan | June 29, 1937 |
| 2,123,347 | Ware | July 12, 1938 |
| 2,369,937 | Baster | Feb. 20, 1945 |